A. LÜHRS.
VENT-FAUCET.
No. 192,588. Patented July 3, 1877.
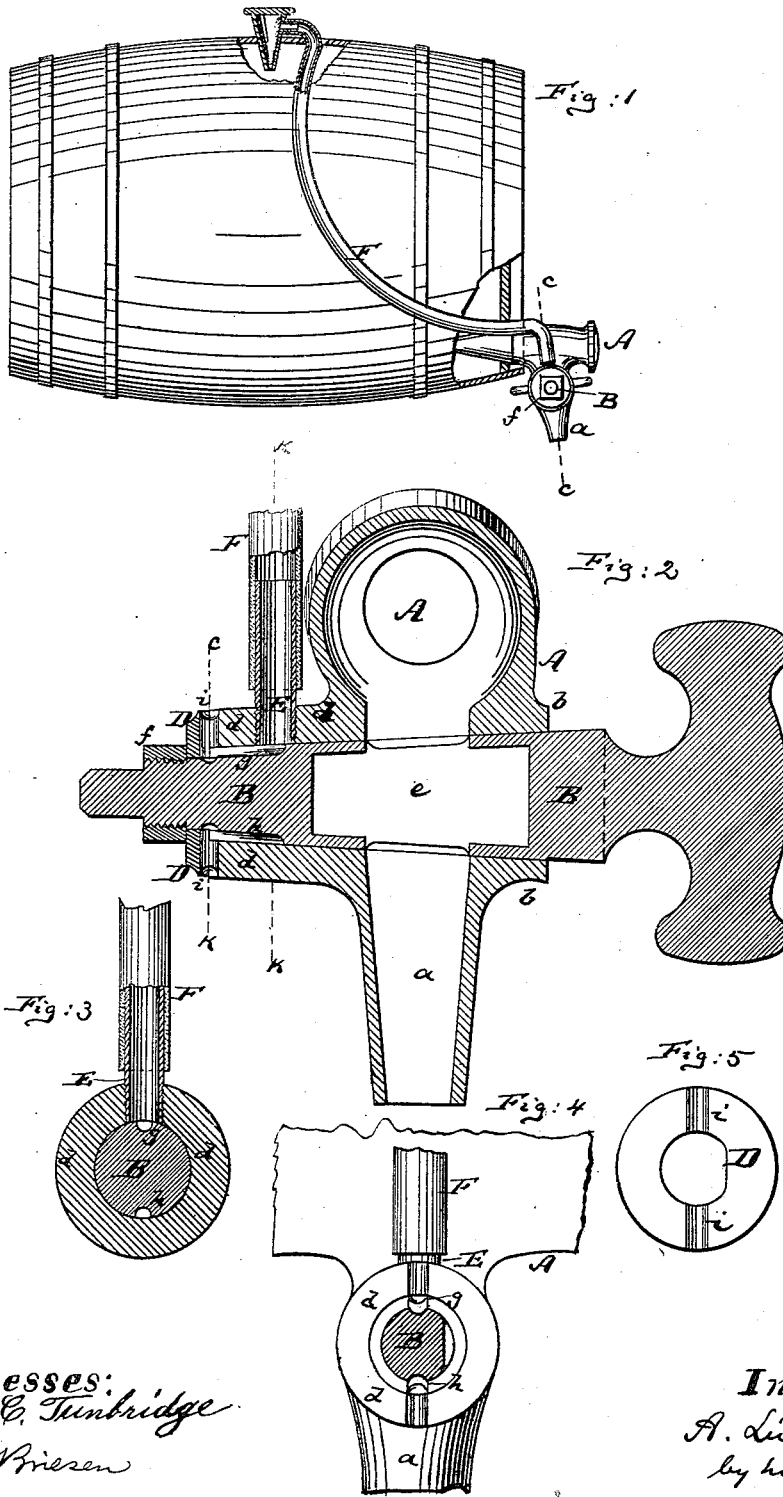
Witnesses:
John C. Tunbridge
A. v. Briesen
Inventor:
A. Lührs
by his attorney
A. v. Briesen

UNITED STATES PATENT OFFICE.

ADOLPH LÜHRS, OF NEW YORK, N. Y.

IMPROVEMENT IN VENT-FAUCETS.

Specification forming part of Letters Patent No. 192,588, dated July 3, 1877; application filed June 11, 1877.

*To all whom it may concern:*

Be it known that I, ADOLPH LÜHRS, of New York city, in the county and State of New York, have invented a new and Improved Vent-Faucet, of which the following is a specification:

This invention relates to an improvement on the vent-faucet for which I made application for a patent that was filed May 4, 1877, and allowed June 5, 1877.

The object of the present improvement is principally to adapt the apparatus to a rotary spigot; and the invention consists, particularly, in providing the spigot with two grooves diametrically opposite to each other, and in combining with it a doubly-grooved rotary washer.

In the drawing, Figure 1 represents a side view of my improved faucet, showing it applied to a barrel. Fig. 2 is a cross-section, the line of section being through the spigot, as indicated by the line *c c*, Fig. 1. Fig. 3 is a detailed cross-section on the line K K, Fig. 2. Fig. 4 is a detailed cross-section on the line C K, Fig. 2; and Fig. 5 is a detailed face view of the rotary doubly-grooved washer.

Similar letters of reference indicate corresponding parts in all the figures.

The letter A represents the body of the faucet, and *a* is the discharge-nozzle of the faucet. B is the spigot, placed through the nozzle transversely, and supported in bearings *b* and *d*, that are formed on the faucet, as clearly shown in Fig. 2. The spigot is perforated, as at *e*, so that it may be turned to let liquid flow from the faucet into the nozzle, or it may be so turned as to shut the nozzle and prevent the discharge of the liquid through the same. The spigot is held in place by a nut, *f*, which is applied to its small end, and bears against a washer, D, which washer faces the end of the bearing *d*. The washer D is made to turn with the spigot, having a flat portion in its central aperture, to match the flat portion on the spigot, as clearly appears by a comparison of Figs. 4 and 5. E is a tube entering the bearing *d*, and intended to communicate by a rubber pipe, F, with the bung-hole of the barrel, as shown in Fig. 1. The spigot B is provided with two grooves, *g* and *h*, which are diametrically opposite each other, and which extend from the line at which the pipe E joins the bearing *d* to the washer D. Whenever the spigot is turned to open the faucet one of these grooves *g h* will be in communication with the pipe E, and with one of two grooves, *i*, which are formed on the inner face of the washer D. In fact, the grooves *i i* on the inner face of the washer (clearly shown in Fig. 5) are continuously in communication with the two grooves *g h*, so that when the faucet is open the pipe E will communicate, by one of the grooves *g h*, with one of the washer-grooves *i*, thereby allowing air to be discharged from the barrel, or to enter the same whenever the faucet is opened.

The advantage of the double system of grooves *g h* and of the rotary washer D is, principally, that the spigot may be entirely revolved, whereby it will preserve its form and proper bearing more perfectly than when the oscillating spigot is used, as described in my former application.

As the ends of the grooves *i* are exposed to view, they serve, also, whenever they are brought into line with a suitable mark on the bearings *d*, to indicate when the faucet is open, partly open, or closed.

I claim as my invention—

The combination of the faucet A, carrying the pipe E, and the spigot-bearing *d*, with the spigot B, having the two grooves *g h*, and with the rotary washer D, having the two grooves *i i*, all substantially as herein shown and described.

The above description of my invention signed this 9th day of June, 1877.

ADOLPH LÜHRS.

Witnesses:
 ERNEST C. WEBB,
 F. V. BRIESEN.